United States Patent
Niemelä et al.

(10) Patent No.: US 8,032,133 B2
(45) Date of Patent: Oct. 4, 2011

(54) SELECTING A NETWORK ENTITY

(75) Inventors: Tuomas Niemelä, Helsinki (FI); Miikka Huomo, Vantaa (FI); Jarmo Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/143,720

(22) Filed: Jun. 3, 2005

(65) Prior Publication Data

US 2006/0229068 A1 Oct. 12, 2006

(30) Foreign Application Priority Data

Apr. 12, 2005 (FI) .................................... 20050369

(51) Int. Cl.
*H04W 4/00* (2009.01)
(52) U.S. Cl. .................. 455/426.1; 455/436; 455/432.1; 455/41.2; 455/161; 455/166.1; 455/434; 455/435.1; 455/435.2; 455/67.11; 455/512; 370/331; 370/492; 370/465; 370/338; 370/328; 370/437; 370/432; 370/407; 370/395.31; 370/332
(58) Field of Classification Search .............. 455/435.2, 455/426.1, 41.2, 432.1, 436, 161, 166.1, 455/166.2, 434, 435.1, 435.3, 443, 452.1, 455/452.2, 450, 464, 502, 509, 512, 525, 455/62, 67.11; 370/331, 492, 465, 338, 328, 370/437, 432, 329, 407, 406, 395.31, 408, 370/395.42, 341, 332, 324
See application file for complete search history.

(56) References Cited

U.S. PATENT DOCUMENTS

2004/0017798 A1* 1/2004 Hurtta et al. .................. 370/352
2006/0099935 A1* 5/2006 Gallagher et al. ......... 455/414.1

FOREIGN PATENT DOCUMENTS

WO WO 01/31963 5/2001

OTHER PUBLICATIONS

"Unlicensed Mobile Access (UMA)"; Architecture (Stage 2), Nov. 3, 2004.
"Unlicensed Mobile Access (UMA)"; Protocols (Stage 3); Nov. 5, 2004.
3GPP TS 23.236 v6.0.0 (Dec. 2004).
3GPP TS 23.003 v6.5.0 (Dec. 2004).
3GPP-ETSI TS 123 003 V6.6.0, "Digital cellular telecommunications system (Phase 2+); Universal Mobile Telecommunications System (UMTS); Numbering, addressing and identification (3GPP TS 23.003 version 6.6.0 Release 6)", Mar. 2005, pp. 1-46.
3GPP—ETSI TS 123 234 V6.4.0, "Universal Mobile Telecommunications System (UMTS); 3GPP system to Wireless Local Area Network (WLAN) interworking; System description (3GPP TS 23.234 version 6.4.0 Release 6)", Mar. 2005, pp. 1-79.
PCT Search Report and Written Opinion for PCT/IB2006/001074 dated Aug. 7, 2006.
3GPP TS 23.236 v6.0.0 (Dec. 2004).

* cited by examiner

*Primary Examiner* — Kwasi Karikari
(74) *Attorney, Agent, or Firm* — Alston & Bird LLP (57) ABSTRACT

A method selects a network entity in a communication system. The method includes receiving, in a controller entity of an unlicensed radio spectrum access network, location information of a communication device connected to one of the unlicensed radio spectrum access network and another access network. The method further includes determining a routing area indication based on the location information. The method further includes selecting, based on the routing area indication, a serving network entity, which provides services for the communication device using at least the unlicensed radio spectrum access network and the another radio access network. Furthermore, a computer program, a controller entity and a communication system are configured to execute the method.

21 Claims, 7 Drawing Sheets

SELECTING A NETWORK ENTITY

FIELD OF THE INVENTION

The invention relates to communication systems. More particularly the invention relates to selecting a network entity, in particular a serving GPRS support node, in a communication system.

BACKGROUND OF THE INVENTION

A communication system can be seen as a facility that enables communication sessions between two or more entities such as one or more communication devices and/or other nodes associated with the communication system. A communication system typically operates in accordance with a given standard or specification setting out what the various entities associated with the communication system are permitted to do and how that should be achieved. A standard or specification may define a specific set of rules, such as communication protocols and/or parameters, on which connections between the entities can be based.

Wireless communication systems include various cellular or otherwise mobile communication systems using radio frequencies for sending voice or data between, stations, for example between a communication device and a transceiver network element. National or international authorities or organizations may allocate a radio frequency band, so-called licensed radio frequencies, to mobile communication networks. Examples of mobile communication systems operating on a licensed spectrum may comprise a public land mobile network (PLMN), such as global system for mobile communication (GSM), general packet radio service (GPRS), and third generation (3G) networks, such as universal mobile telecommunications system (UMTS). The 3G network may use wideband code division multiple access (W-CDMA) technology or other air interfaces, such as the enhanced data rates for global evolution (EDGE), multi-carrier code division multiple access (CDMA2000).

A mobile communication network may logically be divided into a radio access network (RAN) and a core network (CN). A communication device may access the communication network via an access entity, such as a transceiver network element, of the RAN. Examples of radio access networks operating on a licensed spectrum may comprise GSM/EDGE radio access network (GERAN) and UMTS terrestrial radio access network (UTRAN).

A single communication system may interface with one or more communication systems, such as with other wireless systems, such as a wireless Internet Protocol (IP) network, wireless local area network (WLAN) and/or fixed line communication systems.

Wireless communication systems may also use unlicensed radio frequencies. Unlicensed Mobile Access (UMA) technology provides access to mobile services over unlicensed spectrum technologies. Examples of unlicensed spectrum technologies may comprise Bluetooth and IEEE 802.11, both operating in an unlicensed 2.4 GHz industrial, scientific and medical (ISM) frequency band.

UMA is an extension of GSM/GPRS/UMTS mobile services into customer premises achieved by tunneling certain GSM/GPRS/UMTS protocols between the customer premises and the core network over a broadband IP network. In UMA, unlicensed spectrum technologies may be used to carry another access protocol, such as GSM, GPRS or UMTS, to reach the GSM/GPRS/UMTS core network when the core network is not directly reachable. From a perspective of an end-user, GSM/GPRS/UMTS services are used. UMA is a complement to a traditional GSM/GPRS/UMTS radio coverage, used to enhance customer premises coverage, increase network capacity and potentially lower costs.

A communication device may establish a packet data connection to a UMA network controller (UNC). Each UNC may control a plurality of UMA cells. The UNC may be connected to one or more controlling or switching elements of the mobile communication systems, such as to one or more serving GPRS support nodes (SGSN). In the GSM/GPRS/UMTS, the SGSN is a network element, which typically keeps track of a location of an individual communication device and performs security functions and access control.

It might be desired to provide a way that the UNC, or another controller network element of unlicensed radio spectrum access network, was able to decide with which controlling or switching element of the core network, in particular with which SGSN, to communicate. This might provide advantages in various situations. A particular example may be a situation where a single SGSN is serving both UMA and GPRS/UMTS cells.

SUMMARY OF THE INVENTION

In accordance with an aspect of the invention, there is provided a method for selecting a network entity in a communication system. The method comprises receiving, in a controller entity of an unlicensed radio spectrum access network, location information of a communication device connected to one of the unlicensed radio spectrum access network and another access network. The method also comprises determining a routing area indication for the unlicensed radio spectrum access network based on said location information. The method also comprises selecting, based on the routing area indication, a serving network entity, which is capable of providing services for said communication device using at least said unlicensed radio spectrum access network and another radio access network.

In accordance with another aspect of the invention, there is provided a computer program comprising program code means for performing any of the steps of the method according to embodiments of the invention when the program is run on a computing means.

In accordance with another aspect of the invention, there is provided a controller entity for an unlicensed radio spectrum access network. The controller entity is configured to receive location information of a communication device connected to one of an unlicensed radio spectrum access network and another access network. The controller entity is also configured to determine a routing area indication for the unlicensed radio spectrum access network based on said location information. The controller entity is also configured to select, based on the routing area indication, a serving network entity, which is capable of providing services for said communication device using at least said unlicensed radio spectrum access network and another radio access network.

In an embodiment, the location information may comprise at least one of a cell global identifier, a routing area code and a routing area identity.

In an embodiment, the routing area indication for the unlicensed radio spectrum access network may be selected based on another routing area indication of said another access network.

In an embodiment, a query for an Internet protocol address of the serving network entity may be performed using the routing area indication for the unlicensed radio spectrum access network. The query may be performed from a directory name service. The Internet protocol address of the serving network entity may be received and the serving network entity may be selected using said Internet protocol address.

In an embodiment, a routing area identity may be mapped with an Internet protocol address of the serving network entity and the serving network entity may be selected using said Internet protocol address.

The serving network entity may comprise a serving general packet radio service support node. The controller entity may comprise an unlicensed mobile access network controller or a mobile switching center.

In an embodiment, the controller entity may comprise a circuit switched part of an unlicensed mobile access network controller handling circuit switched connections and the circuit switched part may be separate from a packet switched part of an unlicensed mobile access network controller handling packet switched data connections, which packet switched part may be integrated in a serving general packet radio service support node, which serving general packet radio service support node may provide said services. The packet switched part and the circuit switched part of the unlicensed mobile access network controller may be connected with an Up+ interface.

In accordance with another aspect of the invention, there is provided a communication system. The communication system comprises at least one packet switched part of an unlicensed mobile access network controller for handling packet switched data connections of an unlicensed mobile access network, integrated in a serving general packet radio service support node, which serving general packet radio service support node is configured to provide services for at least said unlicensed mobile access network and another radio access network. The communication system also comprises a circuit switched part of said unlicensed mobile access network controller for handling circuit switched connections of the unlicensed mobile access network. The circuit switched part is configured to receive location information of a communication device connected to one of said unlicensed mobile access network and said another radio access network, to determine a routing area indication for the unlicensed radio spectrum access network based on said location information, and to select from the at least one packet switched part, based on the routing area indication, a packet switched part, which is capable of providing services for said communication device using at least said unlicensed mobile access network and another radio access network.

BRIEF DESCRIPTION OF THE DRAWINGS

The invention will now be described in further detail, by way of example only, with reference to the following examples and accompanying drawing, in which:

FIGS. 4 a-d show block diagrams illustrating further embodiments of the invention.

DETAILED DESCRIPTION OF PREFERRED EMBODIMENTS

Figure 1:
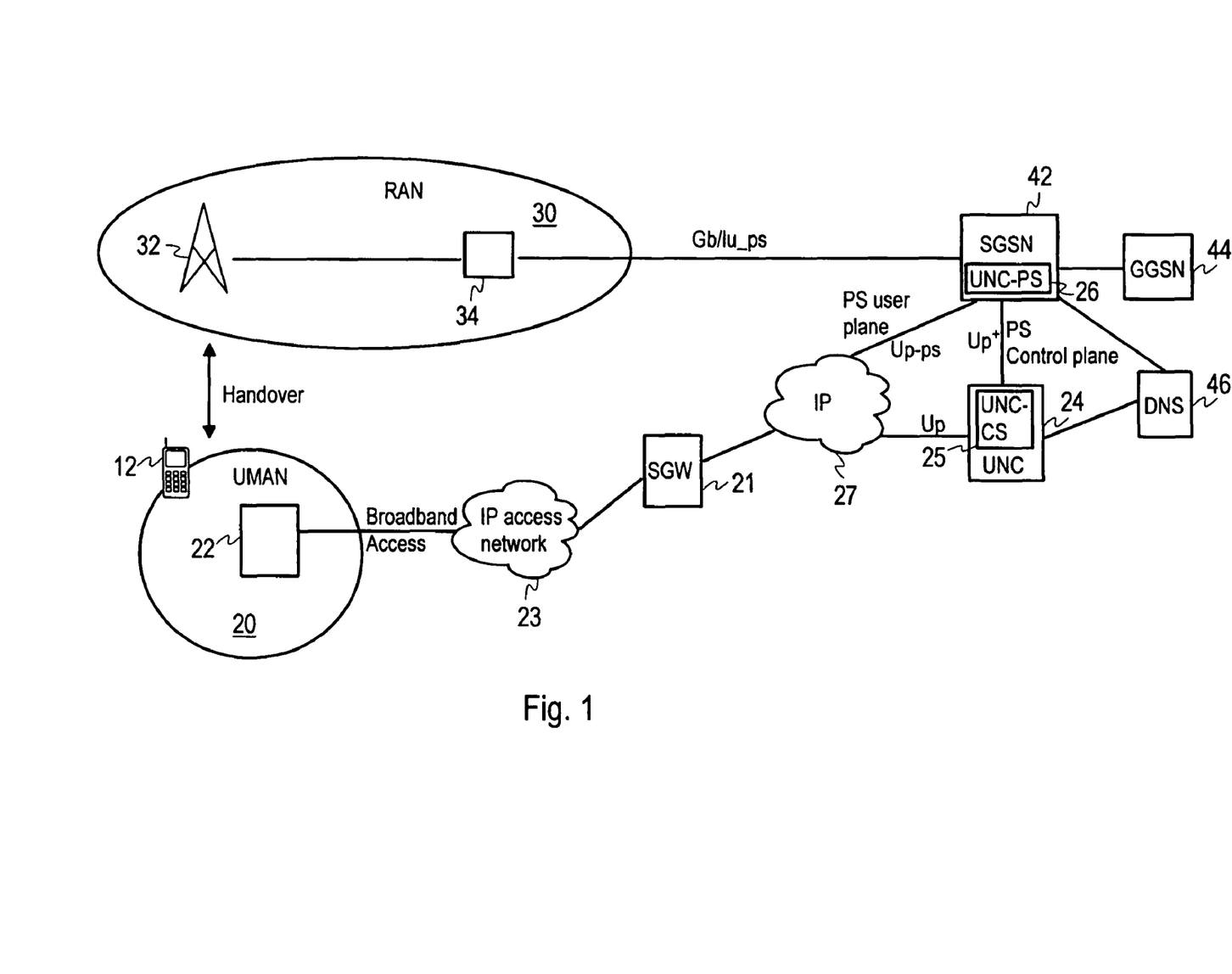
FIG. 1 shows an example of an arrangement in which the embodiments of the invention may be implemented.

FIG. 1 shows an exemplifying arrangement in which embodiments of the invention may be implemented. The arrangement of FIG. 1 comprises a first access network 20 and a second access network 30. A communication device 12 may be able to access a communication system, such as a core network (CN) of a PLMN, via the first access network 20 or via the second access network 30.

The communication device 12 used by an end-user for accessing at least one of the access networks 20, 30 may be any appropriate communication device, also called terminal. Examples may comprise user equipment (UE), a mobile station (MS), a cellular phone, a personal digital assistant (PDA) and a personal computer (PC). The communication device 12 may comprise a multimode communication device, which is able to communicate with multiple different networks. A communication device, which is able to communicate with two different networks, may be called a dual-mode communication device. Furthermore, the communication device 12 may support multiple radio access technologies to communicate with a single core network, and thus alternative access methods for the same services. The radio frequencies and the communication protocols may be different in these different networks. In particular, the radio frequencies may be licensed in at least one of the different networks and unlicensed in at least one other of the different networks. Examples of communication protocols may comprise, but are not limited to, session initiation protocol (SIP), wireless session protocol (WSP), hypertext transfer protocol (HTTP), transmission control protocol (TCP), and protocols of IEEE 802.11 and Bluetooth.

In an embodiment, a communication device 12 may use unlicensed radio frequencies for communicating with the first access network 20. In an embodiment, the communication device 12 may access an IP network 27 over a broadband IP network 23 via an access point 22 in the first access network 20. The first access network 20 may be an UMA network (UMAN) and the access point 22 may be an UMAN access point (UMAN AP), such as a Bluetooth access point or an 802.11 access point. A security gateway (SGW) 21 authenticates the communication device 12 trying to access from the first access network 20, such as from the UMAN. The security gateway 21 terminates accessing tunnels from the first access network 20 to the communication device 12 and allocates a valid IP address for the communication device 12.

For providing the communication device 12 with access to the core network, a controller network element of the first access network 20, such as an UMA network controller (UNC) 24, is shown to interface switching entities of the core network, such as an serving GPRS support node (SGSN) 42 and further a gateway GPRS support node (GGSN) 44.

Between the communication device 12 and the UNC 24, an Up interface is provided. The Up interface operates over an IP transport network and relays GSM/GPRS/UMTS signaling between the PLMN core network and the communication device.

In an embodiment, the communication device 12 may be able to connect the core network through the second access network 30 via an access point 32, such as a base station, using licensed radio frequencies. The access point 32 may be connected via a controller network element 34, such as a radio network controller (RNC) or a base station controller (BSC), to the SGSN 42. The second access network 30 may be a radio access network (RAN), such as a GERAN or UTRAN, and may thus use, for example, GPRS, EDGE or W-CDMA technologies. The second access network 30 may also be another access network using licensed radio frequencies.

It shall be appreciated that FIG. 1 is only an example showing only two access means in connection with one communication device. The number and type of entities concerned in a communication system and in access technologies may differ substantially from that which is shown. The communication networks typically comprise various further switching and other control entities and gateways for enabling the communication for interfacing a single communication network with one or more communication networks. In order to enhance clarity, only a part of the control entities is shown in FIG. 1. A communication system is typically arranged to serve a plurality of communication devices. Furthermore, a communication device may have several simultaneous communication connections to different or heterogeneous networks, for example, but not limiting to, a number of SIP sessions and activated packet data protocol (PDP) contexts. Communication devices may be connected to the communication system from the same or different networks.

Referring back to FIG. 1, the functions of the UNC 24 may be distributed among an UNC-CS part 25 handling the circuit switched (CS) connections and an UMAN control plane, and an UNC-PS part 26 handling the packet switched (PS) data connections. In an embodiment, the UNC-CS and the UNC-PS are connected with a so-called Up+ interface. One UNC-CS part may have interfaces to multiple UNC-PS parts and one UNC-PS may be connected to multiple UNC-CS parts. An A-interface and all circuit switched connection control functions are implemented in the UNC-CS part. A Gb interface is implemented in the UNC-PS part.

Functions common to both CS and PS may be mainly allocated to the UNC-CS part 25. The UNC-CS 25 part may coordinate some of the common functions with the UNC-PS 26 via the Up+ interface. In an embodiment, the UNC-CS 25 functions may be integrated to a dedicated network element, such as the UNC 24, as shown in FIG. 1. In alternative embodiment, the UNC-CS 25 functions may be integrated to a mobile services switching center (MSC) server or another appropriate network entity. In an embodiment as shown in FIG. 1, functions of the UNC-PS part 26 may be integrated to a SGSN 42 (serving GPRS support node). The UNC-PS part 26 integrated in the SGSN 42 is herein also referred to as UNC-PS (SGSN) 26, 42. The UNC-PS may be also known by other names, such as a GPRS gateway.

Between the communication device 12 and the UNC-PS (SGSN) 26, 42, an Up_ps interface is provided for a PS user plane signaling.

An UMA radio resource (UMA-RR) protocol is implemented in the UNC-CS 25 part. The UNC-PS 26 part may optionally be involved, via the Up+ interface, with procedures common to CS and PS activities of the communication device. The UMA-RR protocol provides a radio resource (RR) management layer in the communication device. The UMA-RR is designed to take advantage of characteristics of an unlicensed radio link, which are quite different from the characteristics of a GERAN radio link. In particular, the UMA-RR provides the following functions: registration with the UNC; setup of a bearer path for circuit switched traffic between the communication device and the UNC; handover support between the GERAN and the UMA; functions such as GPRS suspension, paging, ciphering configuration, classmark change, application level keep-alive, and so on; and support for identification of the access point being used for UMA access.

An UMA radio link control (UMA-RLC) protocol for a user plane is implemented in the UNC-PS part 26. The UMA-RLC protocol for a control plane is implemented in the UNC-CS part 25 with the UNC-PS part 26 involved in the procedures via the Up+ interface. The UMA-RLC protocol provides the following services: delivery of GPRS signaling and short message service (SMS) messages over a secure tunnel; paging, flow control, GPRS transport channel management; and transfer of GPRS user plane data.

A security gateway (SGW) 21 interfaces both the UNC-CS and the UNC-PS parts. A security gateway function is implemented as a logically separate entity, but physically the security gateway may be integrated either to the UNC-PS part, to the UNC-CS part or to some other network element.

It has now been found that irrespective of the exact functions used on the Up+ interface, the UNC-CS part 25 needs to be able to select the UNC-PS part 26 to be used for a mobile station, as the UNC-CS part 25 may connect to multiple UNC-PS parts.

A single SGSN 42 may be able to serve the communication device 12 in both unlicensed and licensed radio frequencies. In particular, the single SGSN 42 may be able to serve the communication device 12 in UMAN as well as in GERAN and UTRAN also when the routing area does not change when the user moves between the UMAN and the GERAN or UTRAN cells. If the UNC-CS part would select the UNC-PS (SGSN) without any knowledge of the GERAN or UTRAN radio network and Gb interface configuration of the SGSNs, the UNC-CS might select an SGSN which is not serving the GERAN or UTRAN area overlapping with the UMAN area where the communication device is located.

For a seamless and robust support of these kinds of handovers, or cell selections, upper protocol layer entities in the SGSN should remain the same when the UNC-PS part 26 is integrated in the SGSN 42. The upper protocol layer entities in the SGSN may comprise, for example, logical link control (LLC), sub-network dependent convergence protocol (SNDCP) and GPRS tunneling protocol (GTP) tunnels.

LLC protocol provides a ciphered logical link between the communication device and the SGSN. SNDCP is a protocol, which provides services to higher layers, which may include connectionless and connection-oriented mode, compression, multiplexing and segmentation. GTP is a protocol between GPRS support nodes (GSNs) in an UMTS/GPRS backbone network.

A concept of a directory name service (DNS) is defined in the GPRS for enabling operators to use logical names instead of IP addresses when referring to nodes, such as to GSNs. Each PLMN typically includes at least one DNS server. When a communication device roams from an SGSN in one PLMN to an SGSN in another PLMN, the new SGSN may acquire an IP address of the old SGSN from the DNS server using the logical name of the old SGSN. The logical name may be constructed out of old routing area identity (RAI) and network resource identifier (NRI) information as defined in 3GPP TS 23.003 V6.5.0 (2004-12); $3^{rd}$ Generation Partnership Project; Technical Specification Group Core Network; Numbering, addressing and identification (Release 6); Annex C, paragraph C.1, resulting in "nriCCC.racDDD.lacEEE.mncYYY.mccSSS.gprs", wherein "nri" signifies network resource identifier, "rac" routing area code, "lac" location area code, "mnc" mobile network code and "mcc" mobile country code. C, D and E are Hex coded digits, and Y and Z are encoded as single digits.

The RAI specifies a routing area within a location area, wherein the location area is identified within a PLMN and a country. The NRI is a part of a temporary identity, which is assigned by a serving core network (CN) node to the communication device. Each CN node, which supports an intra domain connection of radio access network (RAN) nodes to multiple CN nodes, is configured with one or more NRI(s). In UMA, if a multipoint Gb interface is used, the NRI is included in a temporary logical link identity (TLLI) of the communication device.

In an embodiment, the UNC-CS part 25 may select the UNC-PS (SGSN) 26, 42 based on a GERAN RAI using a RAI-SGSN IP address mapping, which is stored in the DNS server. The communication device 12 may report a GERAN cell global identifier (CGI) of the communication device 12 to the UNC-CS part 25. The CGI comprises a mobile country code (MCC), a mobile network code (MNC), a location area code (LAC) and a cell identifier (CI). The RAI of the SGSN 42 may be constructed based on the GERAN CGI and a routing area code (RAC).

The RAC may be received form the communication device 12 in an UMA radio resource (URR) registration request message. The URR registration request message has several information elements (IEs), such as International Mobile Subscriber Identity (IMSI), UMA Release Indicator, UMA Classmark, Radio Identity, GSM RR State, GSM Coverage Indicator, Cell Identity, Location Area Identification, Routing Area Code, Geographical Location, AP Location, Register reject Cause, Redirection Counter, Last UNC SGW IP Address and Fully Qualified Domain Name (FQDN), and Last UNC IP Address and FQDN.

The communication device may include an overlapping GSM CGI+RAC to a registration request message. The communication device may also include the UNC AP via which the communication device connects to the UMAN. Based on this information the UNC-CS may be able to determine location of the communication device. If the UNC-CS accepts the communication device, the UNC-CS may provide the communication device with a new location in a register accept message including a cell identity and a location area identifier (LAI). The communication device may then provide this identity information to higher protocol layers, such as GPRS mobility management (GMM), which may perform for example a routing area update (RAU) if the RAC has changed.

If the RAC+LAI has remained unchanged, it may be beneficial at least in some cases for the UNC-PS to be aware of the URR registration. This may be needed if the communication device changes to the UMAN access in a GMM STANDBY state and does not perform a cell update to the SGSN or if the cell update is lost. In such cases, SGSN may not know, for example, from which access and from which UNC-CS to page the communication device.

The RAI constructed or determined based on the GERAN CGI and the RAC may be used for a DNS query from a DNS server 46 for finding out the SGSN 42. If a multipoint Gb is used, the NRI extracted from the TLLI of the communication device may also be included in the query.

In a further embodiment, the RAI-SGSN IP address mappings can be configured in the UNC-CS part 25. Also, any other configuration is possible. For example, an UMAN AP or a geographical location may be directly mapped to a GERAN RAI and a SGSN IP address.

Figure 2:
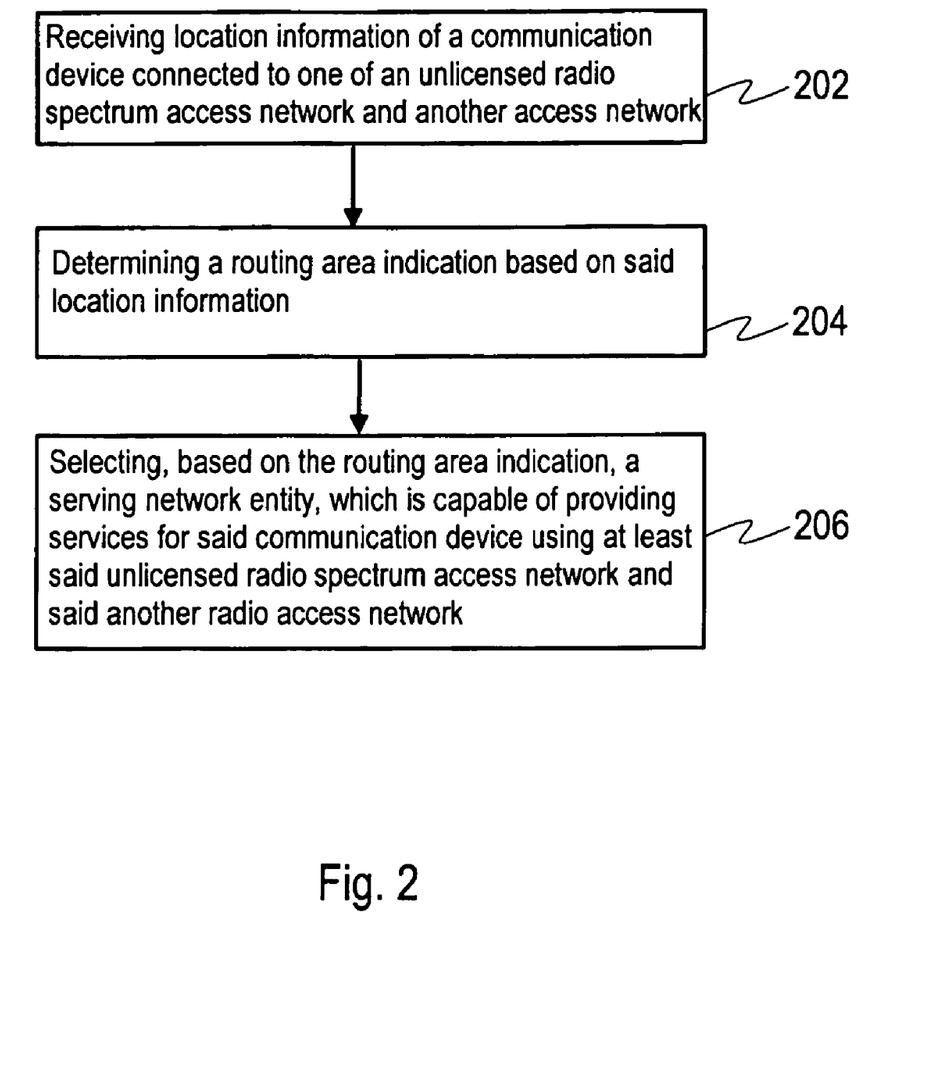
FIG. 2 shows a flow chart illustrating an embodiment of the invention.

FIG. 2 shows a flow chart illustrating an embodiment according to the invention. In step 202, location information of a communication device connected to one of an unlicensed radio spectrum access network and another access network is received. In step 204, a routing area indication is determined based on said location information. In step 206, a serving network entity, which is capable of providing services for said communication device using at least said unlicensed radio spectrum access network and said another network, is selected based on the routing area indication.

Figure 3:
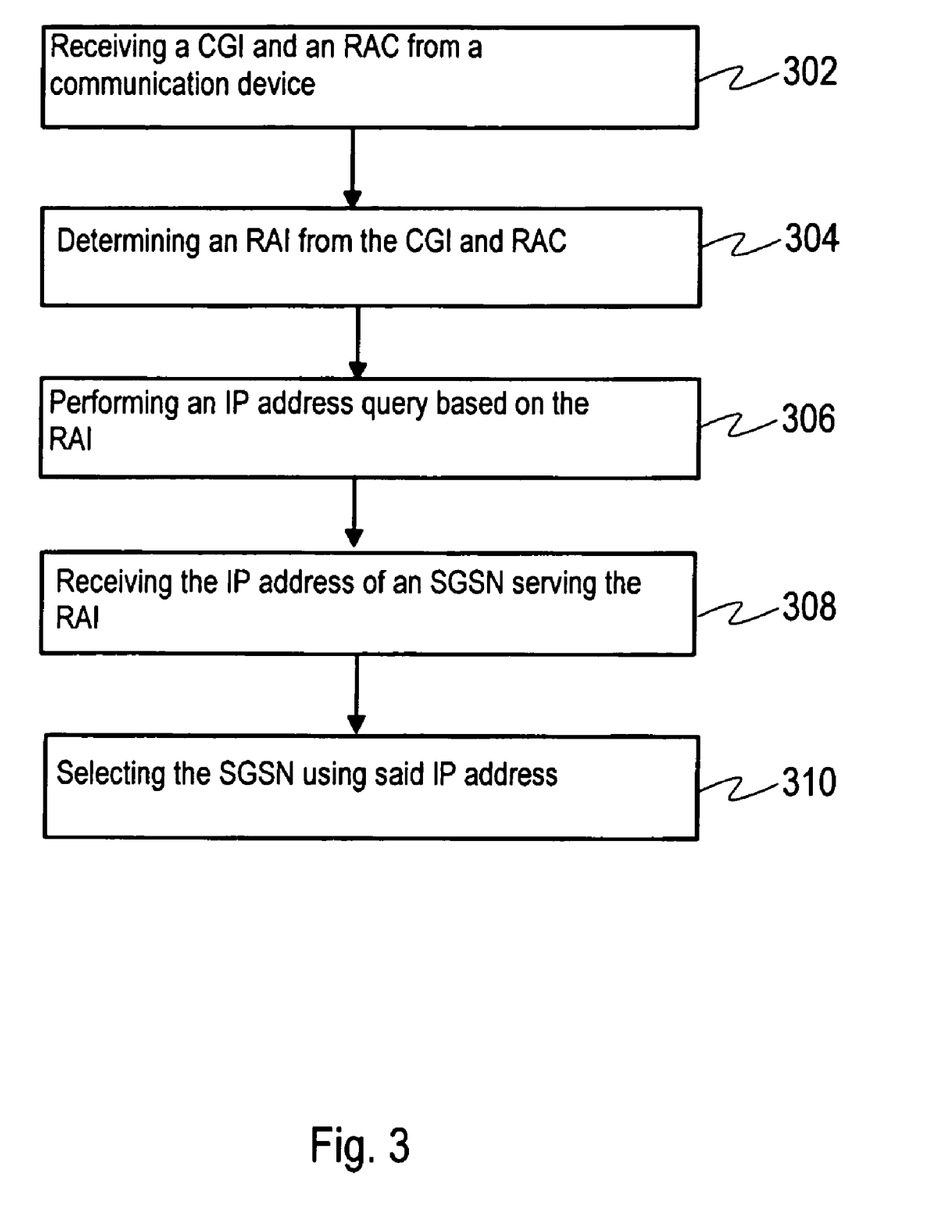
FIG. 3 shows a flow chart illustrating a further embodiment of the invention.

FIG. 3 shows a flow chart illustrating a further embodiment according to the invention. In step 302, a cell global identifier (CGI) and a routing area code (RAC) are received from a communication device, which is connected to an unlicensed mobile access network (UMAN). For example, the UNC-CS part 25 of the UNC 24 receives a GERAN CGI from the communication device 12. In step 304, a routing area identity (RAI) is determined from the CGI and the RAC. For example, the UNC-CS 25 determines the RAI from the CGI and RAC received from the communication device 12. In step 306, an IP address query is performed based on the RAI for determining an IP address of an SGSN, which is capable of providing services for the communication device using the UMAN and a GPRS network. For example, the UNC-CS 25 performs a DNS query for finding out the IP address of the SGSN from the DNS server 46 using the RAI for constructing a logical address of the SGSN 42. If a multipoint Gb interface is used, also the NRI is included in the DNS query in addition to the CGI and the RAC. In step 308, the IP address of the SGSN serving the RAI is received. For example, the DNS server 46 replies with the IP address of the SGSN 42 serving the RAI. In step 310, the SGSN is selected using said IP address. For example, the UNC-CS part 25 selects the UNC-PS (SGSN) 26, 42 using the SGSN IP address received in step 308.

In a further embodiment, the DNS query can be omitted when the RAI-SGSN IP address mappings are configured to the UNC-CS part 25. In this embodiment, the UNC-CS part 25 of the UNC 24 receives a GERAN CGI and a RAC from the communication device 12. The UNC-CS 25 determines the RAI from said CGI and RAC. The IP address of the SGSN 42 serving the RAI is fetched from the RAI-SGSN IP address mappings configured in the UNC-CS 25. The UNC-CS part 25 selects the UNC-PS (SGSN) 26, 42 using the fetched SGSN IP address.

FIGS. 4 a-d show further embodiments of the invention. In the embodiments of FIGS. 4 a-d, the UNC-CS part is implemented in an MSC server 48.

Figure 4A:
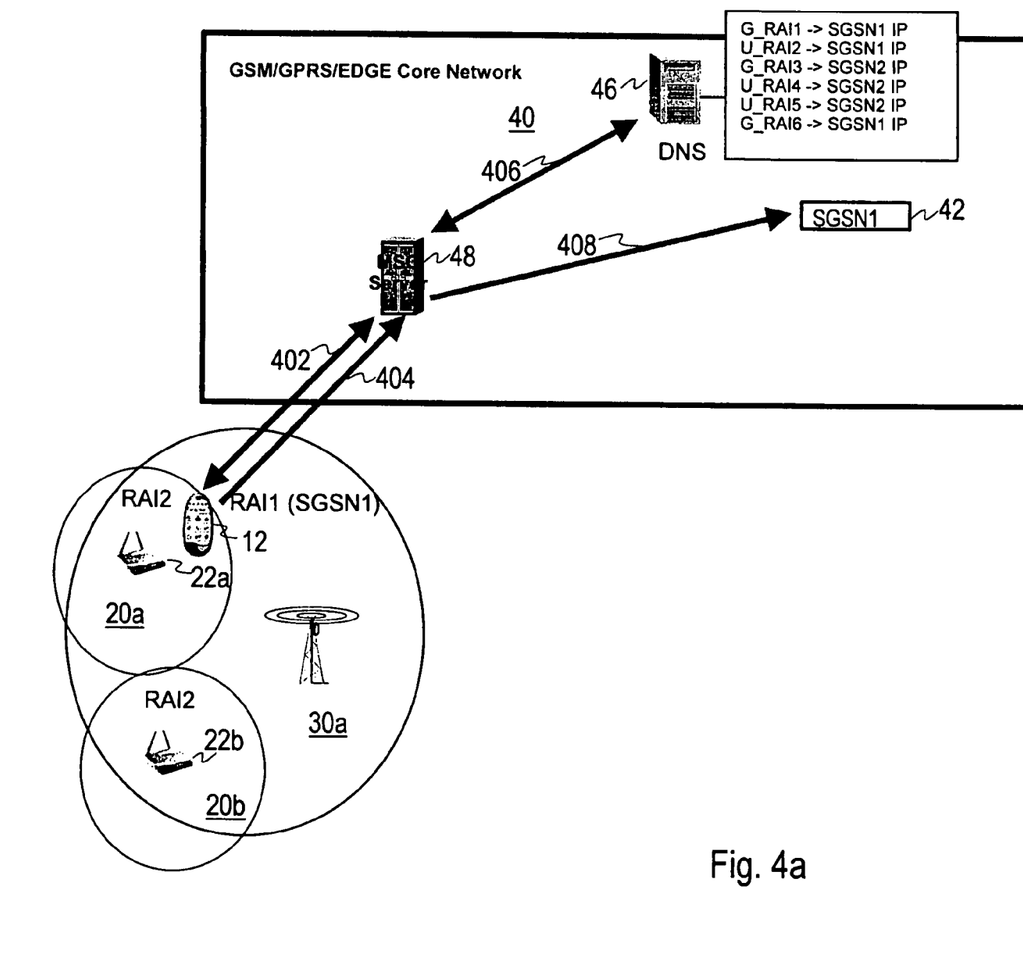

Reference is first made to FIG. 4a. The communication device 12 is shown to access the core network 40 via a first access point 22a in a first cell 20a of a first access network. A second access point 22b in a second cell 20b of the first access network is also shown. The first and second cells 20a and 20b of the first access network overlap with a first cell 30a of a second access network. The first and second access networks may be the same or different access networks than the first and second access networks shown in FIG. 1.

In the embodiment shown in FIGS. 4 a-d, the first access network comprises an access network using unlicensed radio frequencies, such as UMAN. The second access network comprises an access network using licensed radio frequencies, such as GERAN or UTRAN using, for example, GPRS, EDGE or W-CDMA technologies. In the following, for clarity, the first access network is referred to as UMAN and the cells 20a and 20b and other respective cells as UMAN cells. Furthermore, the second access network is referred to as RAN and respective cells as RAN cells. However, it shall be appreciated that embodiments may be applicable in other access networks as well.

Referring back to FIG. 4a, an UMA registering 402 is performed and the MSC server 48 may allocate the UMAN cell 20a, 20b based on the overlapping RAN cell 30a. The MSC server 48 may include a mapping functionality for indicating the overlapping UMAN and RAN cells. The mapping functionality in the MSC server 48 may be configured to map all the UMAN cells or access points overlapping a service area of a single RAN routing area identity (RAN RAI) such that all said UMAN cells have a common UMAN RAI.

In an alternative, the UMAN cells may each have an own UMAN RAI. Each UMAN RAI overlapping with the single RAN RAI may then be configured for the same SGSN IP address than the single RAN RAI. For example, the DNS server 46 may comprise information on both RAN RAI(s) and UMAN RAI(s) pointing to particular SGSN(s).

In the example of FIG. 4*a*, the UMAN cells 20*a*, 20*b* may be allocated a UMAN routing area identity UMAN RAI2 including a UMAN routing area code UMAN RAC2. In this example, the UMAN cell 20*a* with RAC2 is allocated for the access point 22*a*.

Upon initial PS signaling 404, the MSC server 48 may perform a DNS query 406 with the UMAN RAI2 in order to resolve the hosting SGSN, if needed. As explained above, the DNS server 46 should be configured so that UMAN RAI(s) and the overlapping GPRS RAI point to the same SGSN. In this example, the DNS server 46 may comprise, for example, the following information: RAN RAI1 and UMAN RAI2 both pointing to SGSN1, RAN RAI3 and UMAN RAI4 both pointing to SGSN2, UMAN RAI5 pointing to SGSN2, and RAN RAI6 pointing to SGSN1. In this example, the DNS query 406 thus returns SGSN1 as the hosting SGSN for the UMAN RAI2.

PS signaling 408 is thus continued with the SGSN1. The PS signaling may comprise transmitting UMA radio link control (URLC) data, such as current UMAN GCI, attach request, routing area update (RAU) and cell update. The SGSN1 then recognizes the UMAN RAI2 as to be a routing area of the SGSN1.

An SGSN may recognize an UMAN RAI as to be a routing area of the SGSN, for example, by means of operator configuring or configuring based on dynamical signaling in the Up+ interface. In an embodiment, the SGSN may perform a DNS query, get the own IP address of the SGSN as a response and thus determine that the routing area is a routing area of the SGSN performing the DNS query.

Figure 4B:
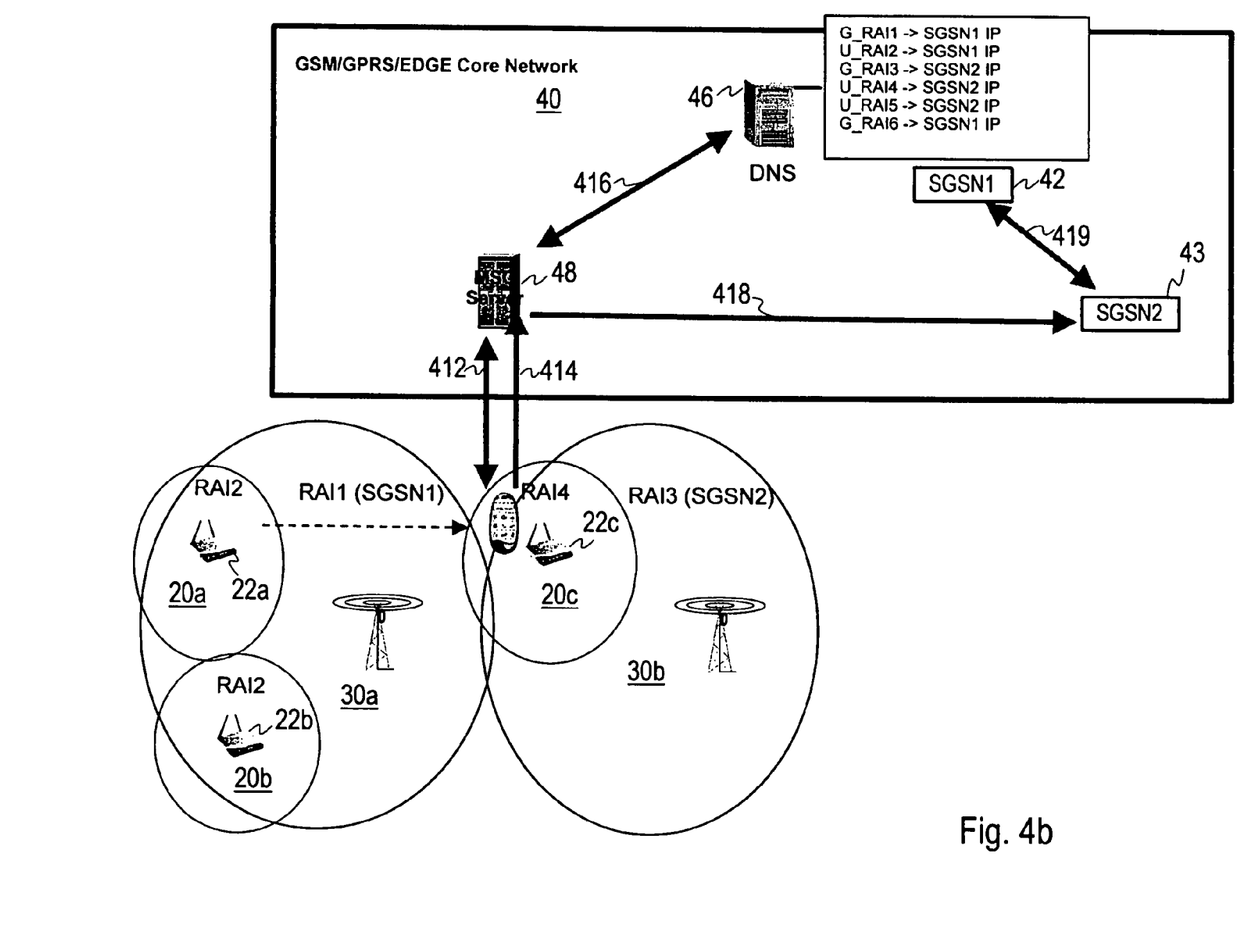

FIG. 4*b* shows a further embodiment, where the communication device 12 moves under a third access point 22*c* in a third UMAN cell 20*c*. Register update signaling 412 is performed. The MSC server 48 has to allocate the UMAN cell again based on the overlapping RAN cell. In the example of FIG. 4*b*, the RAN cell and thus the RAN routing area identity has changed to RAN RAI3. The UMAN cell 20*c* with RAC4 is allocated for the third access point 22*c*.

Upon succeeding PS signaling 414, the MSC server 48 notices that the UMAN RAI has changed and thereby the previously determined SGSN IP address is not necessarily valid. The MSC server 48 performs a DNS query 416 to the DNS server 46, which is configured as determined above. In this example, the DNS query 416 thus returns SGSN2 as the hosting SGSN for the UMAN RAI4.

PS signaling 418 is continued with the SGSN2. The SGSN2 recognized the RAI4 as to be a routing area of the SGSN2, but does not recognize the "old RAI2" in a RAU request. The SGSN2 may perform a DNS query 419 to resolve the SGSN IP address for the old SGSN.

Figure 4C:
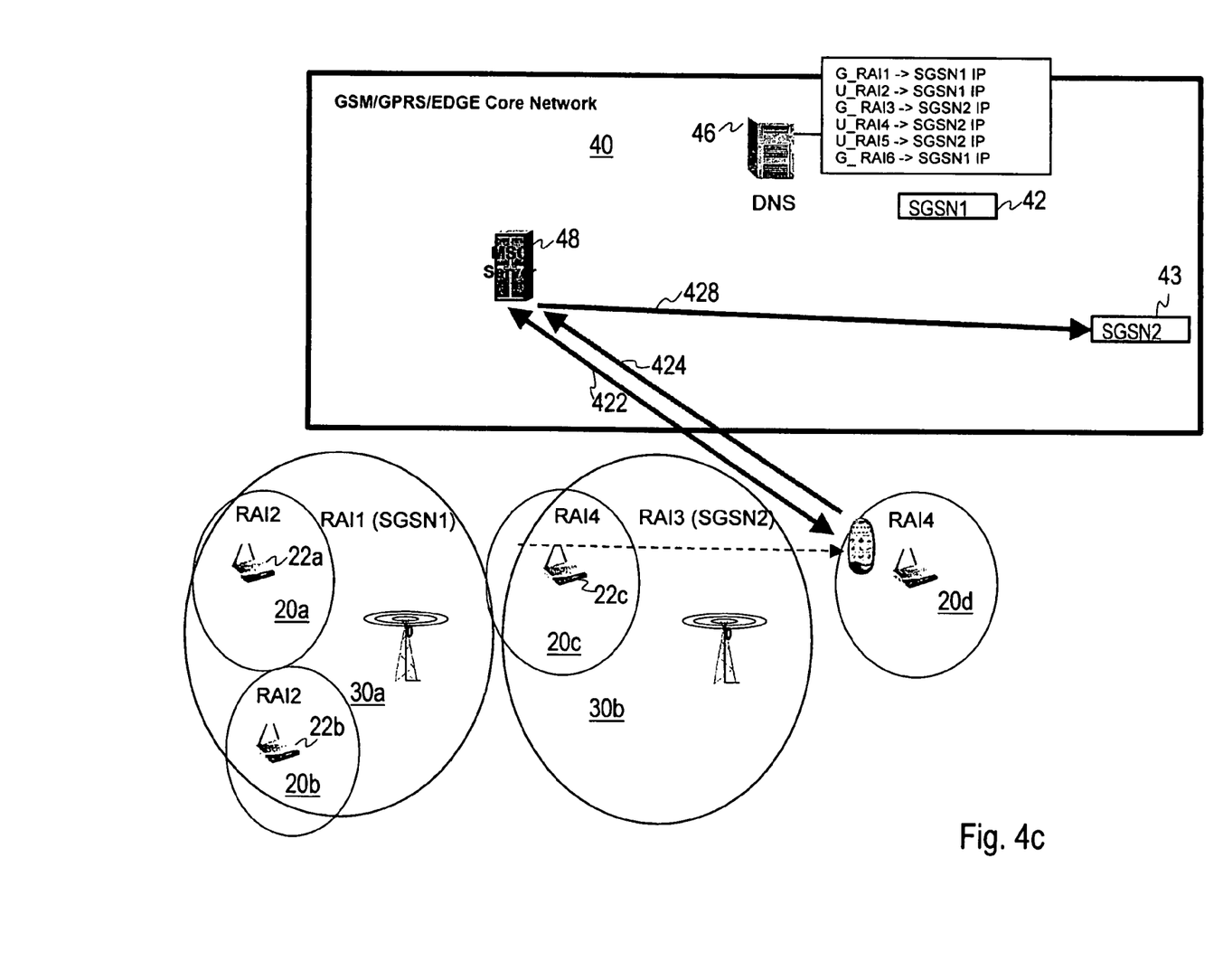

FIG. 4*c* shows a further embodiment, where the communication device 12 moves under another access point in a fourth UMAN cell 20*d*. Register update signaling 422 is performed. The fourth UMAN cell 20*d* does not have an overlapping RAN cell. The MSC server 48 preferably allocates the UMAN cell 20*d* with the same RAC as the previous access point 22*c*. The UMAN cell 20*c* with RAC4 is thus allocated for the access point 22*c* as has a routing area identity RAI4.

The UMAN RAI(s) that do not have any overlapping RAN RAI may be freely distributed between SGSNs. Preferably the RAI allocated earlier for the communication device 12 is maintained. This may reduce a need for changing the SGSN.

In the example of FIG. 4*c*, RAI4 is maintained and the communication device 12 remains to be registered to the SGSN2. There is no need for a new DNS query PS signaling 424 and 428 is performed with the MSC server and the SGSN2.

Figure 4D:
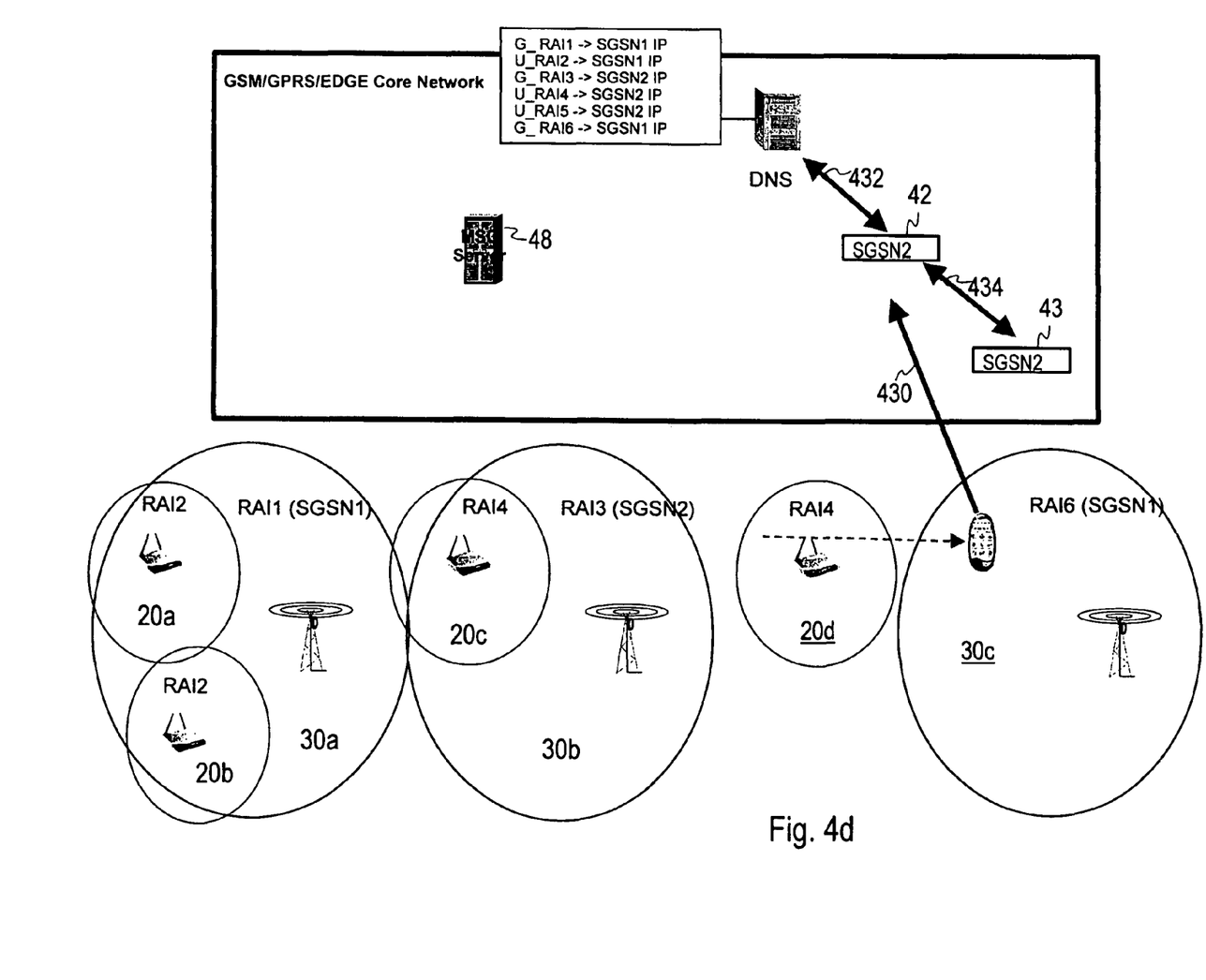

FIG. 4*d* shows a further embodiment, where the communication device 12 moves under another access point in a third RAN cell 30*c*, which does not overlap with an UMAN cell. The SGSN1 is found to host RAI6 of the third RAN cell 30*c*. The SGSN1 receives a RAU request 430, but does not recognize the "old RAI4". The SGSN1 performs a DNS query 432 and receives SGSN2 IP address as a result. The SGSN1 may further perform an SGSN context request 434 with the SGS2.

Operation of the UNC-CS part may thus be selected by an operator, for example. In an embodiment, the UNC-CS part may be operated so that the same SGSN is tried to be maintained as long as possible when the communication device is in UMA. If a RAN, such as GPRS, service area is available, the UMAN RAI is selected based on the RAN RAI: If there is no RAN service area, the SGSN is selected based on load division such that for each SGSN an own unique UMAN RAI is configured both in the DNS and in the UNC-CS.

In a further embodiment, the operator may select an operation where the SGSN is selected based on load division despite of RAN RAI, which may or may not exist. The communication device might be locked to a particular SGSN as long as the communication device remains in the UMA. In other words, the same SGSN may be kept as long as the communication device is packet switched attached via UMAN. To achieve smooth change of access an inter-SGSN RAU may be performed when the communication device returns to the RAN. The DNS may thus include one UMAN RAI for each SGSN.

The above embodiments may be combined. The SGSN may be selected based on the RAN RAI, but the SGSN once selected is not changed for as long as the communication device stays in the UMA.

Although the invention has been described in the context of particular embodiments, various modifications are possible without departing from the scope and spirit of the invention as defined by the appended claims. It should be appreciated that whilst embodiments of the present invention have mainly been described in relation to mobile communication devices such as mobile stations, embodiments of the present invention may be applicable to other types of communication devices that may access communication networks. Furthermore, embodiments may be applicable to other appropriate communication systems, even if reference has mainly been made to mobile communication systems.

The invention claimed is:

1. A method, comprising:
receiving location information of a communicator connected to an unlicensed radio spectrum access network or another radio access network;
determining a routing area identity for the unlicensed radio spectrum access network based on said location information, wherein the determining comprises selecting the routing area identity for the unlicensed radio spectrum access network based on another routing area identity of said another radio access network;
obtaining a mapping of the routing area identity to an internet protocol address of a serving network entity from a domain name server; and
selecting, in a circuit switched part of a controller of the unlicensed radio spectrum access network, the serving network entity using the internet protocol address of the serving network entity, the serving network entity comprising a packet switched part of an unlicensed network controller separate from the circuit switched part, wherein the selecting is based on the mapping of the routing area identity to the internet protocol address of the serving network entity, and wherein the serving network entity is configured to provide services for said communicator using at least said unlicensed radio spectrum access network and said another radio access network.

2. The method according to claim 1, wherein the receiving comprises receiving at least one of a cell global identifier, a routing area code and a routing area identity.

3. The method according to claim 1, wherein the selecting comprises causing a query for the internet protocol address of the serving network entity to be performed using the routing area identity for the unlicensed radio spectrum access network.

4. The method according to claim 3, wherein causing the query to be performed comprises causing the query to be performed from a directory name service.

5. The method according to claim 3, further comprising: receiving the internet protocol address of the serving network entity and using said internet protocol address to select the serving network entity.

6. The method according to claim 1, further comprising: directing providing of said services with a serving general packet radio service support node.

7. The method according to claim 1, wherein the receiving comprises receiving said location information in one of an unlicensed mobile access network controller and a mobile switching center.

8. The method according to claim 1, wherein the packet switched part is integrated in a serving general packet radio service support node, wherein the serving general packet radio service support node provides said services.

9. The method according to claim 8, further comprising: causing the packet switched part and the circuit switched part of the unlicensed mobile access network controller to be connected with an interface.

10. A non-transitory computer-readable medium having a computer program stored thereon, the computer program configured to control a processor to perform a process, the process comprising:
receiving location information of a communicator connected to the unlicensed radio spectrum access network or another radio access network;
determining a routing area identity for the unlicensed radio spectrum access network based on said location information, wherein the determining comprises selecting the routing area identity for the unlicensed radio spectrum access network based on another routing area identity of said another radio access network;
obtaining a mapping of the routing area identity to an internet protocol address of the serving network entity from a domain name server; and
selecting, in a circuit switched part of a controller of an unlicensed radio spectrum access network, the serving network entity using the internet protocol address of the serving network entity, the serving network entity comprising a packet switched part of an unlicensed network controller separate from the circuit switched part, wherein the selecting is based on the mapping of the routing area identity to the internet protocol address of the serving network entity, and wherein the serving network entity is configured to provide services for said communicator using at least said unlicensed radio spectrum access network and said another radio access network.

11. An apparatus comprising at least one processor and at least one memory including computer program code, the at least one memory and the computer program code configured to, with the at least one processor, cause the apparatus at least to:
receive location information of a communicator connected to an unlicensed radio spectrum access network or another radio access network;
determine a routing area identity for the unlicensed radio spectrum access network based on said location information, wherein being caused to determine the routing area identity comprises selecting the routing area identity for the unlicensed radio spectrum access network based on another routing area identity of said another radio access network;
obtain a mapping of the routing area identity to an internet protocol address of the serving network entity from a domain name server; and
select, in a circuit switched part of the unlicensed radio spectrum access network controller, the serving network entity using the internet protocol address of the serving network entity, the serving network entity comprising a packet switched part of an unlicensed network controller, separate from the circuit switched part, wherein the selecting is based on the mapping of the routing area identity to the internet protocol address of the serving network entity, and wherein the serving network entity is configured to provide services for said communicator using at least said unlicensed radio spectrum access network and said another radio access network.

12. The apparatus according to claim 11, wherein the location information comprises at least one of a cell global identifier, a routing area code and a routing area identity.

13. The apparatus according to claim 11, wherein the apparatus is further caused to perform a query for the internet protocol address of the serving network entity using the routing area identity for the unlicensed radio spectrum access network.

14. The apparatus according to claim 13, wherein the apparatus is further caused to perform the query from a directory name service.

15. The apparatus according to claim 13, wherein the apparatus is further caused to receive the internet protocol address of the serving network entity, and to select the serving network entity using said internet protocol address.

16. The apparatus according to claim 11, wherein the serving network entity comprises a serving general packet radio service support node.

17. The apparatus according to claim 11, wherein the apparatus comprises an unlicensed mobile access network controller or a mobile switching center.

18. The apparatus according to claim 11, wherein the packet switched part is integrated in a serving general packet radio service support node, wherein the serving general packet radio service support node is configured to provide said services.

19. The apparatus according to claim 18, wherein the packet switched part and the circuit switched part of the unlicensed mobile access network controller are connected with an interface.

20. An apparatus comprising:
a circuit switched part of an unlicensed radio spectrum access network controller, wherein the circuit switched part comprises:
receiving means for receiving location information of a communicator connected to an unlicensed radio spectrum access network or another radio access network;

determining means for determining a routing area identity for the unlicensed radio spectrum access network based on said location information, wherein the determining means comprises means for selecting the routing area identity for the unlicensed radio spectrum access network based on another routing area identity of said another radio access network;

means for obtaining a mapping of the routing area identity to an internet protocol address of the serving network entity from a domain name server; and selecting means for selecting the serving network entity using the internet protocol address of the serving network entity, the serving network entity comprising a packet switched part of an unlicensed network controller separate from the circuit switched part, wherein the selecting is based on the mapping of the routing area identity to the internet protocol address of the serving network entity, and wherein the serving network entity is configured to provide services for said communicator using at least said unlicensed radio spectrum access network and said another radio access network.

21. A system, comprising:

a serving network entity configured to provide services for at least an unlicensed mobile access network and another radio access network, wherein the serving network entity comprises at least one packet switched part of an unlicensed mobile access network controller; and a circuit switched part of an unlicensed radio spectrum access network controller, wherein the circuit switched part is configured to:

receive location information of a communicator connected to an unlicensed radio spectrum access network or another radio access network, determine a routing area identity for the unlicensed radio spectrum access network based on said location information, wherein being configured to determine the routing area identity comprises being configured to select the routing area identity for the unlicensed radio spectrum access network based on another routing area identity of said another radio access network, obtain a mapping of the routing area identity to an internet protocol address of the serving network entity from a domain name server, and select the serving network entity using the internet protocol address of the serving network entity;

wherein the serving network entity comprises a packet switched part of an unlicensed network controller, separate from the circuit switched part;

wherein the selecting performed by the circuit switched part is based on the mapping of the routing area identity to the internet protocol address of the serving network entity; and wherein the serving network entity is configured to provide services for said communicator using at least said unlicensed radio spectrum access network and the another radio access network.

* * * * *